Figure 1:
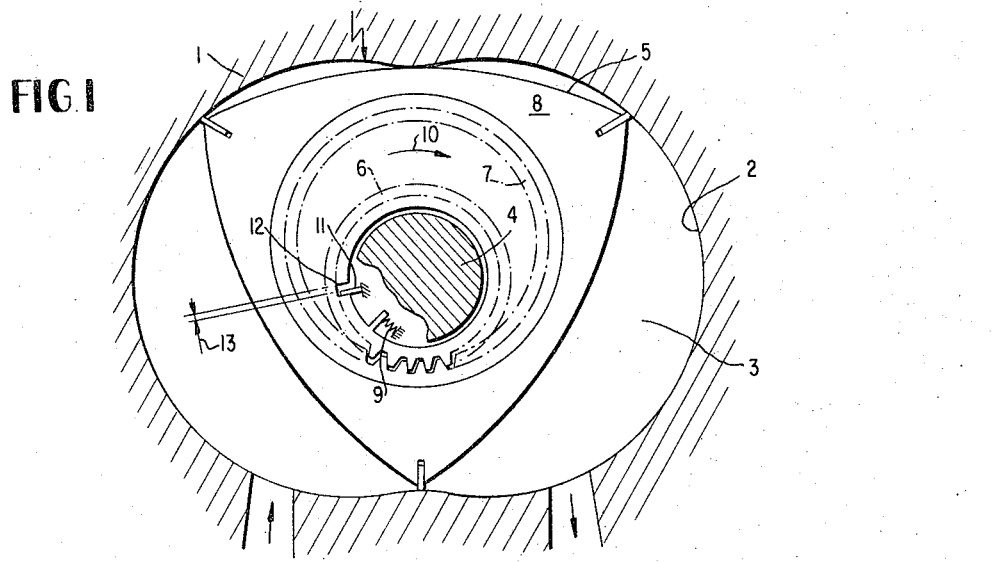

Jan. 31, 1967  E. BRAUN ETAL  3,301,229
ROTARY PISTON ENGINE
Filed April 24, 1964

INVENTORS
EBERHARD BRAUN
JOHANNES GASSMANN
BY Dicke + Craig
ATTORNEY

3,301,229
ROTARY PISTON ENGINE

Eberhard Braun, Waiblingen, and Johannes Gassmann, Altbach, Wurttemberg, Germany, assignors to Daimler-Benz Aktiengesellschaft, Unterturkheim, Germany
Filed Apr. 24, 1964, Ser. No. 362,431
Claims priority, application Germany, May 10, 1963, D 41,528
12 Claims. (Cl. 123—8)

The present invention relates to a rotary piston internal combustion engine of trochoidal construction whose housing includes a body or casing provided with an internal cam surface which together with the lateral parts, defines an interior space through which extends, perpendicularly to the lateral parts, an eccentric shaft on the eccentric of which is rotatably supported a polygonal piston whose rotational speed is at a predetermined fixed ratio to the rotational speed of the eccentric shaft by means of a gear transmission.

With internal combustion engines of the type described, it has now been discovered in actual operation, contrary to the pre-existing notion and assumption that the gear transmission is loaded only by very slight forces, that quite considerable forces act on the gear transmission which lead relatively rapidly to wearing breakages and failures at the gear teeth. These forces stem from a certain non-uniformity in the acceleration and deceleration of the piston rotation on the eccentric shaft and in the main also from the fact that during change or alternation in the abutment of the bearings as a result of the gas forces or mass forces on the piston, the unavoidable bearing clearance of the piston on the eccentric shaft and of the eccentric shaft in the lateral part is eliminated instantaneously. The present invention therefore aims at constructing the gear transmissions in such a manner that the forces to be absorbed show no harmful effects, and in solution of the underlying problems, essentially consists in that a gear wheel of the gear transmission which is arranged at a part of the internal combustion engine, for example, at a lateral part or at the piston and which does not rotate relative to this part, is supported elastically yieldingly within limits in the circumferential direction thereof so that the occurring forces are absorbed springingly and resiliently.

With an internal combustion engine in which a pinion of the gear transmission is supported coaxially or concentrically to the eccentric shaft at a lateral part of the engine, the pinion according to a construction of the present invention may be arranged at a bushing or sleeve surrounding the bearing of the eccentric shaft in the lateral housing part and the bushing or sleeve can be pressed with pre-stress by means of springs arranged at the outer wall of the lateral part against an abutment from which the bushing or sleeve disengages and moves back or recedes in the circumferential direction under the influence of the forces acting on the pinion in a direction opposite the direction of rotation of the piston against the forces of the aforementioned springs up to a counter-abutment.

The springs may consist in a structurally simple manner, of individual sets of leaf springs which engage in the radial direction into the bushing or sleeve and which, distributed regularly with respect to the circumference of the bushing, are supported in a disk that is flangedly connected to the lateral part of the engine.

The abutment and/or the counter-abutment for the limitation of the movement of the pinion in the circumferential direction thereof may be constituted by a bolt secured at the disk receiving the springs which bolt engages in the radial direction in a longitudinal groove provided in the bushing or sleeve.

Accordingly, it is an object of the present invention to provide a rotary piston internal combustion engine of trochoidal construction having a gear transmission for controlling the rotary speed of the piston which eliminates by structurally simple means, that are operationally extremely reliable, the aforementioned shortcomings and drawbacks encountered with the prior art constructions.

It is another object of the present invention to provide a rotary piston internal combustion engine of trochoidal construction having a gear transmission in which the gear transmission is so constructed as to substantially lessen the wear and tear in the transmission caused in particular by non-uniformities in accelerations and decelerations of the piston.

Still another object of the present invention resides in the provision of a rotary piston internal combustion engine of trochoidal construction having a gear transmission controlling the rotary speed of the piston in which means are provided within the gear transmission to effectively counteract the almost instantaneous elimination of the bearing clearance of the piston on the eccentric shaft, and of the eccentric shaft in the housing parts caused by changes in abutment of the bearing due to the gas forces and mass forces occurring in the engine.

Another object of the present invention resides in the provision of a rotary piston internal combustion engine which permits, by simple means that can be readily installed and serviced, a limited elastic yielding of certain parts of the gear transmission controlling the rotary speed of the piston in order to nullify the harmful influences that may be caused by forces that have to be absorbed normally by the transmission.

Figure 2:
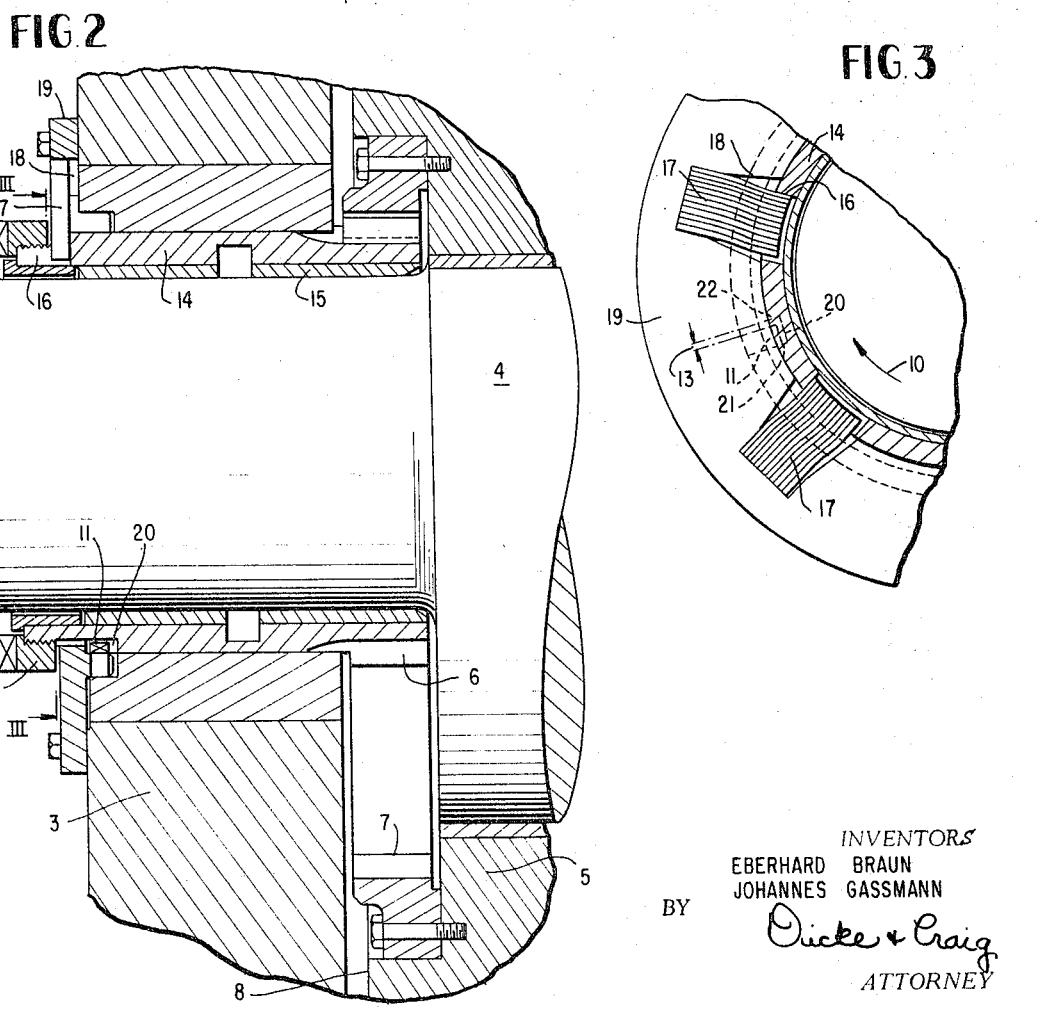
Figure 3:
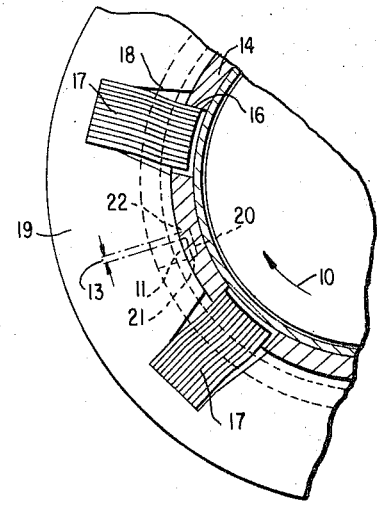

These and other objects, features and advantages of the present invention will become more obvious from the following description, when taken in connection with the accompanying drawing which shows, for purposes of illustration only, one embodiment in accordance with the present invention, and wherein FIGURE 1 is a schematic transverse cross sectional view through a rotary piston internal combustion engine of trochoidal construction with a gear transmission in accordance with the present invention, for controlling the rotation of the piston and consisting of mutually meshing pinion and ring gear;

FIGURE 2 is a partial longitudinal cross sectional view through a lateral part of an internal combustion engine according to FIGURE 1, provided with a gear transmission for the control of the piston rotation in accordance with the present invention, and FIGURE 3 is a partial cross sectional view, taken along line III—III of FIGURE 2.

Referring now to the drawing wherein like reference numerals are used throughout the various views to designate like parts, and more particularly to the schematic showing of FIGURE 1, the rotary piston internal combustion engine of trochoidal construction illustrated therein essentially consists of the housing or casing 1 provided with the internal cam surfaces 2, of the lateral housing or casing parts 3 and of the polygonal piston 5, arranged on the eccentric shaft 4, which rotates relative to the eccentric shaft 4 and which slides during the rotating movements with the radial seals thereof arranged at the piston corners along the internal cam surfaces 2 of the casing or housing 1. The rotation of the piston 5 relative to the eccentric shaft 4 is controlled by a gear transmission which consists of a pinion 6 and of a ring gear 7. The pinion 6 is arranged concentrically to or mounted coaxially relative to the eccentric shaft 4 and is supported at a lateral part of the engine so that the pinion 6 does not rotate. The internal ring gear 7 meshing with the pinion 6 which is disposed concentrically or coaxially to the piston 5 is secured at the end face 8 of the piston 5. In order that the forces which are exerted from the piston 5 on the gear transmission are absorbed by the gear transmission in an elastically yielding manner, the pinion 6 is supported at the lateral part springily or resiliently in the circumferential direction thereof within certain limits. More particularly, the pinion 6 is pressed with pre-stress by means of the spring 9 which is supported at the lateral part, in the direction of arrow 10 corresponding to the direction of rotation of the piston 5 against the abutment 11 rigid at the lateral part. A play or clearance 13 in the circumferential direction of the pinion 6 is thereby produced between the abutment 11 and the counter-abutment 12 at the pinion 6 so that the pinion 6, in case of influences by forces which are transmitted from the piston 5 to the ring gear 7 and which seek to rotate the piston 5 in a direction opposite the direction of rotation thereof, is able to yield or move elastically yieldingly opposite the direction of arrow 10 by the amount of this play or clearance 13.

In the practical embodiment of the present invention according to FIGURES 2 and 3, the teeth of the pinion 6 which are in meshing engagement with the teeth of the ring gear 7, are arranged at the sleeve 14 which is disposed coaxially or concentrically to the bearing 15 for the eccentric shaft 4 in the lateral part 3 and protrudes therebeyond.

Recesses or cut-in portions 16 regularly distributed over the circumference are provided at the end of the sleeve 14 projecting out of the lateral part 3, into which engages a respective set of leaf springs 17. Each set of leaf springs 17 is supported in the direction radial to the sleeve 14 within apertures or cut-out portions 18 of the disk 19 which is flangedly connected at the lateral part 3. As may be seen particularly from FIGURE 3, the end of each set of leaf springs 17 engaging into the corresponding recesses 16 of the sleeve 14 is curved or bent in the direction of rotation of the piston 5 and presses the bushing 14 and therewith the pinion 6 in this circumferential direction indicated by the arrow 10. The bolt 11 constructed as abutment is provided for the limitation of the path in the circumferential direction which bolt 11 is securely supported in the disk 19 and engages into the longitudinal groove 20 arranged at the sleeve 14. The wall 21 of the longitudinal groove 20 is normally pressed against the bolt 11. In this position, the pinion 6 has its normal starting position in which a regular rotation of the piston of the internal combustion engine is assured. The wall 22 of the longitudinal groove 20 as counter-abutment 12 (FIGURE 1) has thereby the clearance 13 from the bolts 11 which, for example, with a certain engine, may assume an amount of 0.25 mm. The leaf spring sets 17 are secured in the disk 19 by the ring 23 threadably secured on the sleeve 14.

Forces which load the gear transmission are effective in such a manner that they seek to rotate by way of the ring gear 7, the pinion 6 in a direction opposite the direction of arrow 10. This movement is absorbed within the clearance 13 elastically yieldingly by the pre-stressed sets of leaf springs 17. The ends of the leaf spring sets 17 engaging into the sleeve 14 yield in a direction opposite the direction of arrow 10 and, after disappearance of the forces, again press the sleeve 14 and therewith the pinion 6 back into the initial position illustrated in FIGURE 2.

While we have shown and described one embodiment in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:
1. A rotary piston internal combustion engine of trochoidal construction, comprising:
 housing means provided with internal surface means and including lateral housing parts defining together with said internal surface means an interior space,
 eccentric shaft means extending through said lateral housing parts and including eccentric means,
 polygonal piston means rotatably supported on said eccentric means,
 and gear transmission means for rotating said piston means at a predetermined ratio to the rotational speed of said eccentric shaft means including gear means arranged at a part of the internal combustion engine in such a manner as to be substantially non-rotatable relative to said last-mentioned part, and means for elastically yieldingly supporting said gear means at said last-mentioned part in such a manner as to prestress said gear means in the normal direction of rotation of the piston means and to yield elastically in only the circumferential direction thereof opposite said normal direction of rotation within given limits.

2. A rotary piston internal combustion engine of trochoidal construction, comprising:
 housing means provided with internal surface means and including lateral housing parts defining together with said internal surface means an interior space,
 eccentric shaft means extending through said lateral housing parts and including eccentric means,
 polygonal piston means rotatably supported on said eccentric means,
 and gear transmission means for rotating said piston means at a predetermined ratio to the rotational speed of said eccentric shaft means including gear means arranged at a part of the internal combustion engine in such a manner as to be substantially non-rotatable relative to said last-mentioned part, and means for elastically yieldingly supporting said gear means at said last-mentioned part in such a manner as to yield elastically in the circumferential direction thereof within given limits,
 said gear means including a pinion supported concentrically to said eccentric shaft means,
 bearing means for said eccentric shaft means within a lateral housing part including sleeve means, said pinion being arranged at said sleeve means, said lateral housing part having an outer wall, relatively fixed abutment means and counter-abutment means within said engine, and spring means arranged at said outer wall for pressing said pinion with pre-stress against said abutment means in such a manner that said sleeve means yields in the circumferential direction thereof under the influence of forces acting on the pinion in a direction opposite to the direction of rotation of the piston means up to the counter-abutment means against the forces of said pre-stressed spring means.

3. A rotary piston internal combustion engine of trochoidal construction, comprising:
 housing means provided with internal surface means and including lateral housing parts defining together with said internal surface means an interior space,
 eccentric shaft means extending through said lateral housing parts and including eccentric means,
 polygonal piston means rotatably supported on said eccentric means, and gear transmission means for rotating said piston means at a predetermined ratio to the rotational speed of said eccentric shaft means including gear means arranged at a part of the internal combustion engine in such a manner as to be substantially non-rotatable relative to said last-mentioned part, and means for elastically yieldingly supporting said gear means at said last-mentioned part in such a manner as to yield elastically in the circumferential direction thereof within given limits, said gear means including a pinion supported concentrically to said eccentric shaft means, bearing means for said eccentric shaft means within a lateral housing part including sleeve means, said pinion being arranged at said sleeve means, said lateral housing part having an outer wall, relatively fixed abutment means and counter-abutment means within said engine, and spring means arranged at said outer wall for pressing said pinion with pre-stress against said abutment means in such a manner that said sleeve means yields in the circumferential direction thereof under the influence of forces acting on the pinion in a direction opposite to the direction of rotation of the piston means up to the counter-abutment means against the forces of said pre-stressed spring means, said pre-stressed spring means consisting of individual sets of leaf springs which engage in the radial direction in said sleeve means and which are regularly distributed over the circumference of said sleeve means, and disk means flangedly secured at said lateral housing part and receiving therein said spring means.

4. A rotary piston internal combustion engine of trochoidal construction, comprising:

housing means provided with internal surface means and including lateral housing parts defining together with said internal surface means an interior space, eccentric shaft means extending through said lateral housing parts and including eccentric means, polygonal piston means rotatably supported on said eccentric means, and gear transmission means for rotating said piston means at a predetermined ratio to the rotational speed of said eccentric shaft means including gear means arranged at a part of the internal combustion engine in such a manner as to be substantially non-rotatable relative to said last-mentioned part, and means for elastically yieldingly supporting said gear means at said last-mentioned part in such a manner as to yield elastically in the circumferential direction thereof within given limits, said gear means including a pinion supported concentrically to said eccentric shaft means, bearing means for said eccentric shaft means within a lateral housing part including sleeve means, said pinion being arranged at said sleeve means, said lateral housing part having an outer wall, relatively fixed abutment means and counter-abutment means within said engine, and spring means arranged at said outer wall for pressing said pinion with pre-stress against said abutment means in such a manner that said sleeve means yields in the circumferential direction thereof under the influence of forces acting on the pinion in a direction opposite to the direction of rotation of the piston means up to the counter-abutment means against the forces of said pre-stressed spring means, said pre-stressed spring means consisting of individual sets of leaf springs which engage in the radial direction in said sleeve means and which are regularly distributed over the circumference of said sleeve means, and disk means flangedly secured at said lateral housing part and receiving therein said spring means, said abutment and counter-abutment means for limiting the movement of the pinion in the circumferential direction thereof being constituted by bolt means secured in said disk means which engage in the radial direction in longitudinal groove means provided at the sleeve means.

5. A rotary piston internal combustion engine of trochoidal construction, comprising:

housing means provided with internal surface means and including lateral housing parts defining together with internal surface means an interior space, eccentric shaft means extending through said lateral parts and including eccentric means, polygonal piston means rotatably supported on said eccentric means, and gear transmission means for rotating said piston means at a predetermined ratio to the rotational speed of said eccentric shaft means including a gear wheel arranged at one of the two parts of the internal combustion engine consisting of a lateral housing part and the piston means in such a manner as to be non-rotatable relative to said one part, and supporting means for elactically yieldingly supporting said gear wheel at said one part in such a manner as to yield elastically only in the circumferential direction thereof opposite the normal direction of rotation of said piston means within given limits.

6. A rotary piston internal combustion engine of trochoidal construction, comprising:

housing means provided with internal surface means and including lateral housing parts defining together with said internal surface means an interior space, eccentric shaft means extending through said lateral parts and including eccentric means, polygonal piston means rotatably supported on said eccentric means, and gear transmission means for rotating said piston means at a predetermined ratio to the rotational speed of said eccentric shaft means including a gear wheel arranged at one of the two parts of the internal combustion engine consisting of a lateral housing part and the piston means in such a manner as to be non-rotatable relative to said one part, and supporting means for elastically yieldingly supporting said gear wheel at said one part in such a manner as to yield elastically in the circumferential direction thereof within given limits, said supporting means including abutment means and counter-abutment means defining said limits, and spring means for normally pressing said gear wheel with pre-stress against said abutment means in such a manner as to enable elastic yielding of said gear wheel against the forces of said spring means in the circumferential direction thereof up to said counter-abutment means under the influence of forces acting on the gear wheel in a direction opposite to the direction of rotation of the piston means.

7. A rotary piston internal combustion engine of trochoidal construction, comprising:

housing means provided with internal surface means and including lateral housing parts defining together with said internal surface means an interior space, eccentric shaft means extending through said lateral parts and including eccentric means, polygonal piston means rotatably supported on said eccentric means, and gear transmission means for rotating said piston means at a predetermined ratio to the rotational speed of said eccentric shaft means including a gear wheel arranged at one of the two parts of the internal combustion engine consisting of a lateral housing part and the piston means in such a manner as to be non-rotatable relative to said one part, and supporting means for elastically yieldingly supporting said gear wheel at said one part in such a manner as to yield elastically in the circumferential direction thereof within given limits, said supporting means including abutment means and counter-abutment means defining said limits, and spring means for normally pressing said gear wheel with pre-stress against said abutment means in such a manner as to enable elastic yielding of said gear wheel against the forces of said spring means in the circumferential direction thereof, up to said counter-abutment means, under the influence of forces acting on the gear wheel in a direction opposite to the direction of rotation of the piston means, said spring means including a plurality of sets of substantially radially directed leaf springs.

8. A rotary piston internal combustion engine of trochoidal construction, comprising:

housing means provided with internal surface means and including lateral housing parts defining together with said internal surface means an interior space, eccentric shaft means extending through said lateral parts and including eccentric means, polygonal piston means rotatably supported on said eccentric means, and gear transmission means for rotating said piston means at a predetermined ratio to the rotational speed of said eccentric shaft means including a gear wheel arranged at one of the two parts of the internal combustion engine consisting of a lateral housing part and the piston means in such a manner as to be non-rotatable relative to said one part, and supporting means for elastically yieldingly supporting said gear wheel at said one part in such a manner as to yield elastically in the circumferential direction thereof within given limits, said supporting means including abutment means and counter-abutment means defining said limits, and spring means for normally pressing said gear wheel with pre-stress against said abutment means in such a manner as to enable elastic yielding of said gear wheel against the forces of said spring means in the circumferential direction thereof up to said counter-abutment means under the influence of forces acting on the gear wheel in a direction opposite to the direction of rotation of the piston means, said abutment and counter-abutment means for limiting the movement of said gear wheel in the circumferential direction thereof being constituted by at least one member operatively connected with one of two parts consisting of said gear wheel and said lateral housing part, and by an aperture for receiving said one member effectively provided in the other of the two last-mentioned parts.

9. A rotary piston internal combustion engine of trochoidal construction, comprising:

housing means provided with internal surface means and including lateral housing parts defining together with said internal surface means an interior space, eccentric shaft means extending through said lateral parts and including eccentric means, polygonal piston means rotatably supported on said eccentric means, and gear transmission means for rotating said piston means at a predetermined ratio to the rotational speed of said eccentric shaft means including a gear wheel arranged at one of the two parts of the internal combustion engine consisting of a lateral housing part and the piston means in such a manner as to be non-rotatable relative to said one part, and supporting means for elastically yieldingly supporting said gear wheel at said one part in such a manner as to yield elastically in the circumferential direction thereof within given limits, said supporting means including abutment means and counter-abutment means defining said limits, and spring means for normally pressing said gear wheel with pre-stress against said abutment means in such a manner as to enable elastic yielding of said gear wheel against the forces of said spring means in the circumferential direction thereof up to said counter-abutment means under the influence of forces acting on the gear wheel in a direction opposite to the direction of rotation of the piston means, said spring means including a plurality of sets of leaf springs, said abutment and counter-abutment means for limiting the movement of said gear wheel in the circumferential direction thereof being constituted by at least one member operatively connected with one of two parts consisting of said gear wheel and said lateral housing part and by an aperture for receiving said one member effectively provided in the other of the two last-mentioned parts.

10. In a rotary piston internal combustion engine of trochoidal construction in which the housing, provided with internal cam surfaces, together with the lateral housing parts defines an interior space within which rotates a polygonal piston rotatably supported on the eccentric of an eccentric shaft extending through said lateral parts, and in which the rotational speed of the piston is controlled by a gear transmission to be at a predetermined ratio to the rotational speed of the eccentric shaft, the improvement essentially consisting of a gear transmission including a gear wheel, and means including substantially radially directed leaf springs for elastically yieldingly supporting said gear wheel with pre-stress at a part of the internal combustion engine in such a manner as to be elastically yielding only in the circumferential direction opposite to the normal direction of rotation of the polygonal piston within predetermined limits relative to said part while being otherwise non-rotatable relative to said part.

11. In a rotary piston internal combustion engine of trochoidal construction in which the housing, provided with internal cam surfaces, together with the lateral housing parts defines an interior space within which rotates a polygonal piston rotatably supported on the eccentric of an eccentric shaft extending through said lateral parts, and in which the rotational speed of the piston is controlled by a gear transmission to be at a predetermined ratio to the rotational speed of the eccentric shaft, the improvement essentially consisting of a gear transmission including a gear wheel, and means including substantially radially directed leaf springs for elastically yieldingly supporting said gear wheel at a part of the internal combustion engine consisting of a lateral housing part and the piston in such a manner as to be elastically yielding in the circumferential direction within predetermined limits relative to said part while being otherwise non-rotatable relative to said part.

12. In a rotary piston internal combustion engine of trochoidal construction in which the housing, provided with internal cam surfaces, together with the lateral housing parts defines an interior space within which rotates a polygonal piston rotatably supported on the eccentric of an eccentric shaft extending through said lateral parts, and in which the rotational speed of the piston is controlled by a gear transmission to be at a predetermined ratio to the rotational speed of the eccentric shaft, the improvement essentially consisting of a gear transmission including a gear wheel, and means for elastically yieldingly supporting said gear wheel at a part of the internal combustion engine in such a manner as to be elastically yielding in the circumferential direction within predetermined limits relative to said part while being otherwise non-rotatable relative to said part, said last-mentioned means including spring means for pre-stressing the gear wheel into one abutment position, and means providing a counter-abutment position of the gear wheel for determining the extent of yielding of said gear wheel.

References Cited by the Examiner

UNITED STATES PATENTS

| | | | |
|---|---|---|---|
| 2,863,335 | 12/1958 | Miller | 74—411 X |
| 2,932,992 | 4/1960 | Larsh | 74—411 X |
| 2,988,065 | 1/1961 | Wankel et al. | |
| 3,077,867 | 2/1963 | Froede. | |

FOREIGN PATENTS

| | | |
|---|---|---|
| 1,352,989 | 1/1964 | France. |

MARK NEWMAN, *Primary Examiner.*

F. T. SADLER, *Assistant Examiner.*